July 2, 1929. T. BOVEY 1,719,530
CONTROL DEVICE FOR AUTOMOBILE HEATERS
Filed Feb. 14, 1925 2 Sheets-Sheet 1
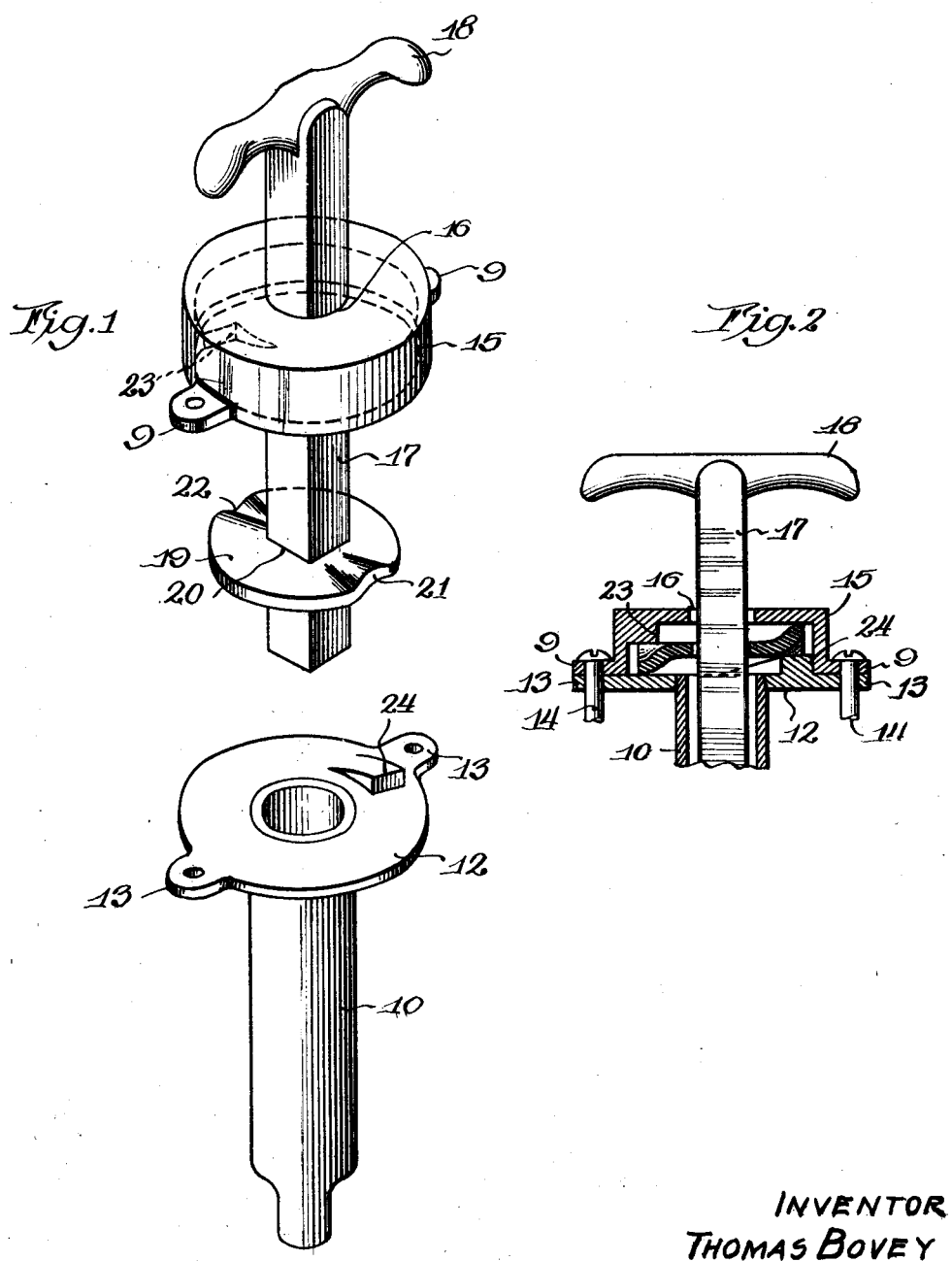
INVENTOR
THOMAS BOVEY July 2, 1929. T. BOVEY 1,719,530
CONTROL DEVICE FOR AUTOMOBILE HEATERS
Filed Feb. 14, 1925 2 Sheets-Sheet 2
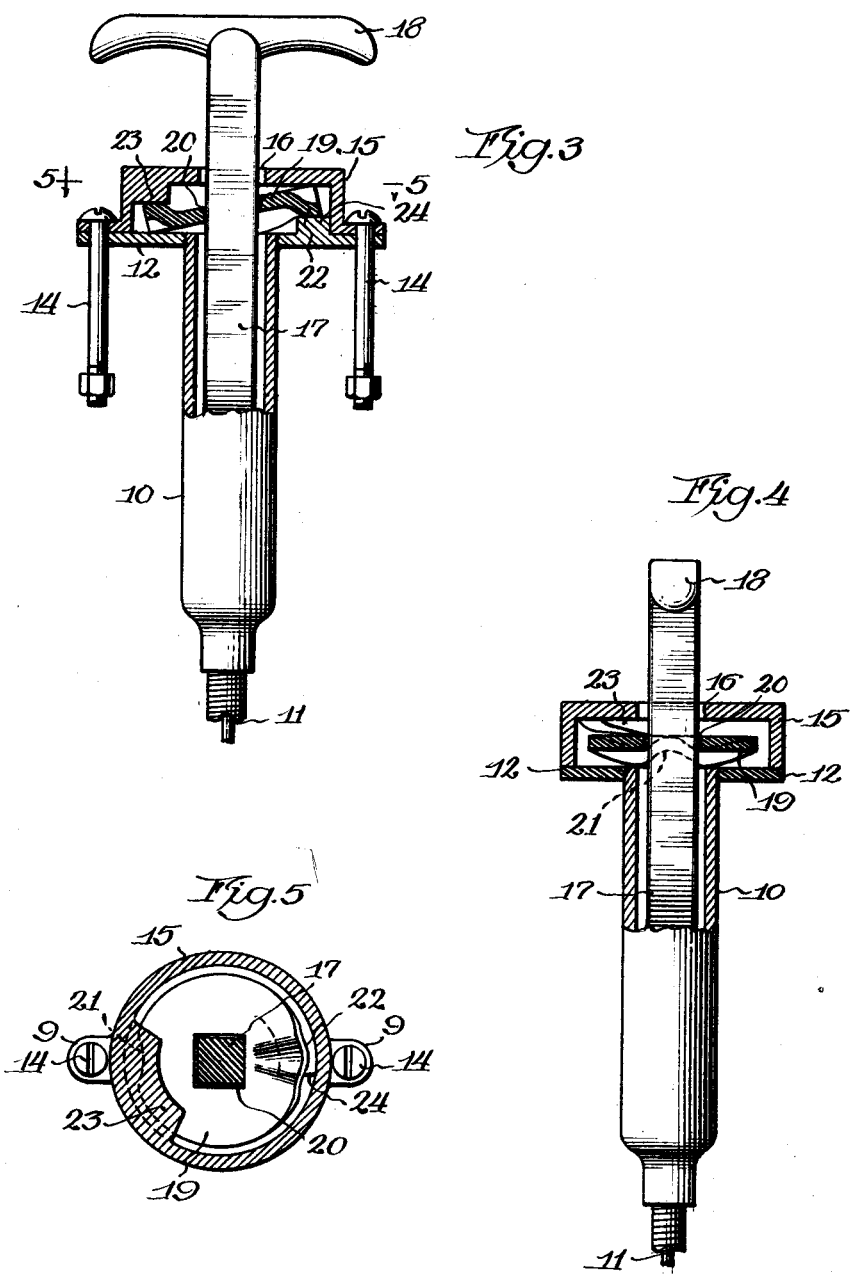
INVENTOR
THOMAS BOVEY Patented July 2, 1929.

1,719,530

UNITED STATES PATENT OFFICE.

THOMAS BOVEY, OF CHICAGO, ILLINOIS.

CONTROL DEVICE FOR AUTOMOBILE HEATERS.

Application filed February 14, 1925. Serial No. 9,274.

My invention relates to means for operating the valve which controls the flow of exhaust gases from an automobile engine to a heater device located within the body of the vehicle. In this connection I have provided an operating handle that is suitably connected with the valve and may be moved longitudinally to adjust the valve and is maintained in divers positions by axially rotating the spindle.

I have provided a structure that is both simple in construction and easy to operate and is adapted to so control the valve that the latter is maintained in any degree of adjustment between its fully opened and closed positions. The device is sturdy and dependable, and its parts are constructed and assembled in a novel manner.

I prefer to carry out my invention and accomplish the before mentioned objects in substantially the manner hereinafter fully described and as more particularly pointed out in the claims. Reference will now be made to the accompanying drawings that form a part of this specification, and schematically illustrate a typical or preferred embodiment of my invention.

In the drawings:—

Fig. 1, is a perspective of the device for operating the valve of an automobile heater, the parts thereof being partially separated and about to be assembled.

Fig. 2, is a vertical axial section of the upper portion of the device showing the positions of the parts when released or unlocked.

Fig. 3, is a vertical axial section showing the parts in wedged or locked positions.

Fig. 4 is a view similar to Fig. 3, with the section taken at a right angle thereto.

Fig. 5 is a transverse horizontal section taken on line 5—5 of Fig. 3, and looking in the direction of the arrows.

In the drawings, I have employed similar reference characters to designate like parts wherever they appear in the several views, and by referring to said drawings it will be observed the structure illustrated comprises an elongated tube 10 the lower portion of which is constructed for the passage and guidance of the element 11, that connects the valve spindle or valve lever to the operating handle. The upper end of this tube has formed therewith or has secured to it a basal plate in the form of a flange or disk 12, that is provided with apertured radial ears 13, through which the bolts or screws 14 pass to secure the device upon its support.

Coacting with the flange 12, and preferably superposed, thereon is a cylindrical housing 15 that is open at its bottom and has its top wall or closure provided with a centrally disposed round aperture 16, and the lower portion of the side wall of this housing is provided with apertured radial ears 9 adapted to registered with the ears 13 on the flange 12 when the parts are assembled. In mounting the structure, a suitable hole is made in the support which is usually the floor of the vehicle so as to receive the tube 10 with the flange 12 resting upon the upper surface of the support, after which the housing 15 is placed upon the flange 12 with the ears of the respective parts in registry, and the bolts or screws 14 are inserted through the apertures in the ears so that the structure is thereby securely clamped together and rigidly mounted upon its support.

The operating device and the means for holding the same in adjustment preferably comprise a spindle or shaft 17 of angular cross-section that is guided by having its corners engage with the edge of the round aperture 16 in the top of the housing and said spindle is long enough to have its lower portion extend down into the tube 10 where the connecting element 11 is suitably secured to its inner end. The opposite end of the spindle projects outside and above the top of the housing 15 and at its extremity it is formed with a transverse handle or hand-grip 18 for longitudinally moving and rotating the spindle. When the handle is in its upper and lower limits of its movement the valve at the exhaust pipe from the engine is either fully opened or fully closed according to the manner of connection with the valve lever or stem.

In order to maintain the handle and spindle in any position of adjustment I have provided cam-actuated or wedging means adapted to coact with said spindle and securely hold the same in its divers positions and at the same time permit of its ready release for the purpose of movement or adjustment to other positions. The element that coacts with the spindle is preferably in the form of an annulus 19 having a circular periphery and is of less diameter than the inside diameter of the housing 15 so that it may be enclosed therein and preferably disposed concentric to the housing. The central or axial opening 20 in the annulus is of angular contour corresponding to the shape of the spindle 17 and is very slightly larger in dimensions than the transverse dimensions of said spindle so as to permit of a minimum amount of looseness between these parts when the spindle is positioned in said opening. The annulus is provided upon diametrically opposite portions with upwardly and downwardly extending projections 21 and 22 respectively which are preferably in the form of undulations, waves or bulges as seen in the drawings. These upper and lower projections are adapted to engage with cam surfaces or wedge pieces 23 and 24 located respectively upon the under side of the top wall of the housing and upon the upper surface of the flange 12. As will be observed the cam surface or wedge pieces are arranged upon diametrically opposite sides of the spindle 17 so that the projections 21 and 22 of the annulus may be engaged therewith.

When this device is operated, the spindle 17 is rotated by the handle until the undulated projection 21 of the annulus is in registry with the cam surface 24 of the flange, at which time the other undulated projection 22, which extends in the opposite direction will be in registry with the cam surface 23 of the top wall of the housing. In this position, it will be noted from Fig. 2, that the annulus is substantially horizontal or in a plane at a right angle to the spindle 17, which latter may be reciprocated freely through the angular opening 20 of the annulus so as to move the element 11 that connects the spindle with the valve lever. After the spindle 17 has been moved inwardly or outwardly, the distance it is desired to adjust the valve said spindle is rotated upon its axis which of course rotates the annulus, which disengages the undulated projections from their cam surfaces so that the annulus becomes inclined and the opposite upper and lower corner edges of the aperture in the annulus will frictionally engage with the adjacent portions of the spindle and maintain the same in position. Further rotation, or in other words, a half rotation of the annulus from the released position shown in Fig. 2 will position the undulated projection 21 under the cam surface 23 while the other projection 22 will have been positioned over the cam surface 24 thereby reversing the position of the parts so that they appear as shown in Fig. 3. The wedging action caused by the undulated projections sliding up the cam surface will further tilt the annulus with the spindle and prevent its accidental longitudinal or axial movement.

What I claim as new is:—

1. A device of the kind described comprising a base plate, a housing thereon, an upper cam upon said housing and a lower cam upon said plate and disposed diametrically opposite each other, a rotatable spindle movable longitudinally through said housing, and an annulus rotated by said spindle, said annulus provided with bulged portions extending above opposite surfaces that coact with said cams whereby said annulus is tilted by a rotation of said spindle to bind upon the latter and maintain the same in divers positions.

2. A device of the kind described comprising a base plate, a housing thereon, an upper cam upon said housing and a lower cam upon said plate and disposed diametrically opposite each other, a rotatable spindle movable through said housing, and an annulus rotated by said spindle and having its edge provided with oppositely disposed upward and downward undulations that coact with said cams to tilt said annulus when rotated whereby to bind upon said spindle and maintain the latter in divers positions.

3. A device of the kind described comprising a spindle mounted for rotational and longitudinal movement, a housing through which said spindle is disposed, an annulus loose within the housing through which the spindle operates, said annulus adapted to be rotated by a rotational movement of the spindle, and said annulus having a concave depression on one face and a concave depression on its other face at a point diametrically opposite the first depression, and oppositely arranged projections within the housing whereby to hold the annulus in normal position when the projections are engaged with the depressions, and when engaged with flat portions of the annulus the projections tilt the annulus to frictionally engage the spindle and maintain the latter against longitudinal movement.

4. A device of the kind described comprising a spindle mounted for rotational and longitudinal movement, a housing through which said spindle is disposed, an annulus loose within the housing through which the spindle operates and is adapted to rotate said annulus, and said annulus having a concave depression on one face and a concave depression on its other face at a point diametrically opposite the first depression, and oppositely arranged projections within the housing having inclined working faces that are engaged by the annulus whereby rotation of the spindle will cause the annulus to ride on said inclined faces, said annulus being in normal position when the projections are engaged in the depressions to permit longitudinal movement of the spindle and when the projections are engaged with the flat portions of the annulus the latter is tilted to frictionally engage the spindle and thereby maintain the latter against longitudinal movement.

5. A device of the kind described comprising a housing, a spindle rotatable and reciprocable therethrough, said housing provided with wedge-shaped cams projecting from opposite surfaces, and an apertured disk in the housing surrounding the spindle and adapted to be rotated thereby, said disk having a depression on one face and a depression on its other face at a point diametrically opposite the first depression, said depressions adapted to engage the cams to maintain the disk transverse to the spindle to permit longitudinal movement of the latter and the remaining portions of the disk adapted to engage the cams to tilt the disk and cause a frictional engagement with the spindle and prevent longitudinal movement.

Signed at Chicago, in the county of Cook, and State of Illinois, this 26th day of January, 1925.

THOMAS BOVEY.